United States Patent [19]

House et al.

[11] Patent Number: 5,274,783
[45] Date of Patent: Dec. 28, 1993

[54] SCSI INTERFACE EMPLOYING BUS EXTENDER AND AUXILIARY BUS

[75] Inventors: Kenneth A. House, Arlington; John Kirk, Boxboro; Lawrence Narhi, Bolton, all of Mass.

[73] Assignee: Digital Equipment Corporation, Maynard, Mass.

[21] Appl. No.: 723,149

[22] Filed: Jun. 28, 1991

[51] Int. Cl.⁵ .............................................. G06F 13/00
[52] U.S. Cl. .................................. 395/325; 364/240.2; 364/DIG. 1; 364/935.46; 364/935.48; 364/DIG. 2
[58] Field of Search ............... 395/325, 725, 275, 425, 395/250; 364/240.2, DIG. 2, 935.46, 935.48, DIG. 2

[56] References Cited

U.S. PATENT DOCUMENTS

| | | | |
|---|---|---|---|
| 4,390,967 | 6/1983 | Eglowstein et al. | 395/325 |
| 4,451,886 | 5/1984 | Guest et al. | 395/325 |
| 4,514,823 | 4/1985 | Mendelson et al. | 395/325 |
| 4,852,043 | 7/1989 | Guest | 395/325 |
| 4,979,097 | 12/1990 | Triolo et al. | 395/325 |
| 4,984,195 | 1/1991 | Nakamura et al. | 395/325 |
| 5,006,981 | 4/1991 | Beltz et al. | 395/325 |
| 5,014,236 | 5/1991 | Pogorzelski et al. | 395/275 |
| 5,109,517 | 4/1992 | Houda et al. | 395/800 |
| 5,123,092 | 7/1992 | Buxton et al. | 395/250 |
| 5,138,703 | 8/1992 | Igarashi | 395/325 |

Primary Examiner—Michael R. Fleming
Assistant Examiner—Glenn A. Auve
Attorney, Agent, or Firm—Cesari and McKenna

[57] ABSTRACT

A bus interface employs a bus extender for connecting an auxiliary bus to a single port on a main bus in such a way as to interconnect one or more host computers on the main bus to one or more peripheral devices on the auxiliary bus. The bus extender employs a transceiver coupled to the main bus, another coupled to the auxiliary bus, and signal transfer and logic circuitry passing signals between and controlling the operation of the transceivers. The circuitry also performs all address translation necessary for inter-bus communication. Once communication links have been established with the designated devices on the other bus, the extender sends message data signals received over the one bus directly onto the other bus without modification. Since the interface can comply with SCSI standards, any of a variety of types of commercially available peripheral devices having controllers complying with those standards can be supported on the auxiliary bus.

26 Claims, 8 Drawing Sheets

SCSI INTERFACE EMPLOYING BUS EXTENDER AND AUXILIARY BUS

FIELD OF THE INVENTION

The invention relates to computer systems, and more particularly to input/output interfaces of the type used to connect peripheral devices to a digital computer.

BACKGROUND OF THE INVENTION

Generally-recognized Small Computer System Interface ("SCSI") standards of the American National Standards Institute (ANSI X3.131-1986) specify the electrical, mechanical and logical characteristics of an input/output (I/O) bus interface for coupling physically small computers with each other and with peripheral devices, for example, disk drives, tape drives, printers, compact disk read-only memories ("CD-ROM's"), and scanners.

Essentially, the SCSI standards specify an I/O bus, commonly called a "SCSI bus." The bus does not require a separate bus controller; instead, a SCSI bus protocol specified by the standards is implemented distributively within central processing units ("CPU's") or, often, host adapters of computers on the bus, and by controllers of peripheral devices on the bus.

The SCSI bus protocol facilitates information transfer between devices connected to the bus. The bus protocol includes an addressing scheme for identifying the devices, and specifies connection-control signals for arbitrating for control of the SCSI bus and establishing a communication link with the intended recipient or target of an information transfer on the bus. Where the host computer is the initiator and a peripheral device on the SCSI bus is the target, this latter process is known in the standards as SELECTION. In certain situations, an information transfer may be interrupted, and, at a later time, the target can reselect the host computer to continue the transfer. This process is called RESELECTION.

Since, generally speaking, any peripheral devices having a controller complying with the SCSI standards can be connected to a SCSI bus, the standards have lead to a proliferation of the types and sources of commercially-available peripheral devices. Moreover, computer systems complying with the standards can be configured and reconfigured with ease by, e.g., end users, to meet specific computing needs and incorporate evolving peripheral device technologies.

The SCSI standards are available from the American National Standards Institute, Inc., New York, N.Y., U.S.A., and are incorporated herein by reference.

While conventionally-implemented SCSI bus interfaces are suitable for their intended purposes, they generally are limited to supporting no more than seven peripheral devices. Heretofore, this limit on the number of peripheral devices has not presented a significant drawback. As systems employing SCSI buses have expanded and become more powerful, however, the need for more storage capacity and the ability to connect to more peripheral devices has grown. For instance, the need for more storage is often particularly acute in multi-user computer systems.

A known approach to increasing the number of SCSI peripheral devices connectable to a SCSI bus employs multiple SCSI ports on the computer, each connected to a separate SCSI bus. Unfortunately, as computers have shrunk in physical size, the space on the computer housing available for such ports has become increasingly limited. Indeed, many computer manufacturers have reduced the number of ports provided on the housing, and do not provide multiple SCSI ports in their standard computer configurations. In addition, this approach often requires additional host adapters to control the information transfer in accordance with the standards.

Alternatively, "juke box" arrangements are known, in which a controller supports a plurality of peripheral devices. Unfortunately, such controllers are dedicated units for supporting specific types of peripheral devices, and can not be used with other types of devices. For example, a known type of juke box supports only tape drives.

Accordingly, it would be desirable to provide an improved, general-purpose interface that can support a greater number of peripheral devices while maintaining reliable connectivity with a host computer. Desirably, also, the improved interface should operate in accordance with SCSI standards.

SUMMARY OF THE INVENTION

The invention resides in a bus interface that employs a bus extender for connecting an auxiliary bus to a single port on a main bus in such a way as to interconnect one or more host computers on the main bus to one or more peripheral devices on the auxiliary bus. Since the interface can comply with SCSI standards, any of a variety of types of commercially-available peripheral devices having controllers complying with those standards can be supported on the auxiliary bus.

The bus extender employs a transceiver coupled to the main SCSI bus, another coupled to the auxiliary bus, and signal transfer and logic circuitry passing signals between and controlling the operation of the transceivers. The circuitry also performs all address translation necessary for inter-bus communication.

In particular, the transfer and logic circuitry (i) receives first connection-control signals from one of the buses, which signals have fields of data designating the extender as the addressee and designating the source of the signals; (ii) identifies the ultimate target for the inter-bus communication based on data contained in the first connection-control signals, or, depending on the direction of the communication, stored in a latch within the extender itself; (iii) generates second connection-control signals including fields of data designating the extender as the source of the communication and the ultimate target; and (iv) provides these latter signals to the appropriate transceiver for transmission over the other bus.

A preferred embodiment of the bus extender takes advantage of dual-tier, hierarchal addressing used in the SCSI standards to direct messages to the designated devices on the other bus. In the addressing scheme employed in the invention, each device connected to either the main or auxiliary bus is identified by a unique identification code ("ID"). In addition, each device ID is associated with an auxiliary identification or address-descriptor, which in the SCSI standards is referred to as a LUN or logical unit number.

For purposes of communication, the bus extender has an ID on both the main and auxiliary buses. Whenever connection-control signals on the redin or auxiliary buses carry the extender's respective ID as a destination ID, the extender responds and attempts to establish the communication link necessary to transfer information to the ultimate recipient on the other bus.

In order to pass messages received over the main bus from a host computer, i.e., during SELECTION, the extender first converts the LUN field data of the connection-control signals received over the main bus to the ID of the target on the auxiliary bus, and supplies the extender's own auxiliary-bus ID as the initiator ID in the auxiliary-bus connection-control signals. Then, the extender attempts to establish a communication link with the target device via connection-control signals on the auxiliary bus using the target ID generated by the extender.

Analogously, in order to continue an earlier, discontinued transfer of messages from a peripheral device on the auxiliary bus to a host computer that initiated the earlier transfer, i.e., RESELECTION, the extender converts the device's ID contained in auxiliary-bus connection-control signals into LUN field data, supplies the extender's own main-bus ID as the target attempting RESELECT, and uses the ID of the initiator of the earlier SELECTION, which the extender has stored (e.g., in a suitable latch) for such purposes.

Once the communication link has been established between the initiator and target for communication in either direction, the extender transfers message data signals (e.g., COMMAND, STATUS, DATA-IN, and DATA-OUT) directly and without modification between the main and auxiliary buses. Thus, as a general rule, the extender intervenes only during the establishment of the communication link and not during the actual transfer of information. This limited role for the extender permits the extender to be economically designed and produced using, e.g., application specific integrated circuitry, and without the need for a microcomputer within the extender.

Moreover, the interface of the invention provides computer system designers with improved flexibility in the type as well as the number of peripheral devices connectable to a host computer. For instance, devices having differential transceivers can be attached to the main bus, and devices having single-ended transceivers can be attached to the auxiliary bus, or vice versa, and these diverse devices can communicate by providing the extender with the appropriate type of transceivers.

The bus extender connects up to seven SCSI peripherals to the main bus. Since SCSI standards permit as many as seven devices in addition to a host computer to be inter-connected by a main bus, and since the invention permits each of the seven devices to be a bus extender, the invention can be practiced to connect as many as 49 peripheral devices to the host computer, a significant increase over the seven peripheral devices generally connectable to a host computer under the standards.

The invention can be practiced also in conjunction with various types of bus interfaces other than SCSI interfaces, provided such other interfaces use a parallel bus architecture and connection-control signals providing both address-ID and address-descriptor fields, which are sent, e.g., over parallel data lines of the bus.

BRIEF DESCRIPTION OF THE DRAWINGS

For a fuller understanding of the nature and objects of the invention, reference should be made to the following detailed description, taken in conjunction with the accompanying drawings, in which.

DETAILED DESCRIPTION OF AN ILLUSTRATIVE EMBODIMENT

Figure 1:
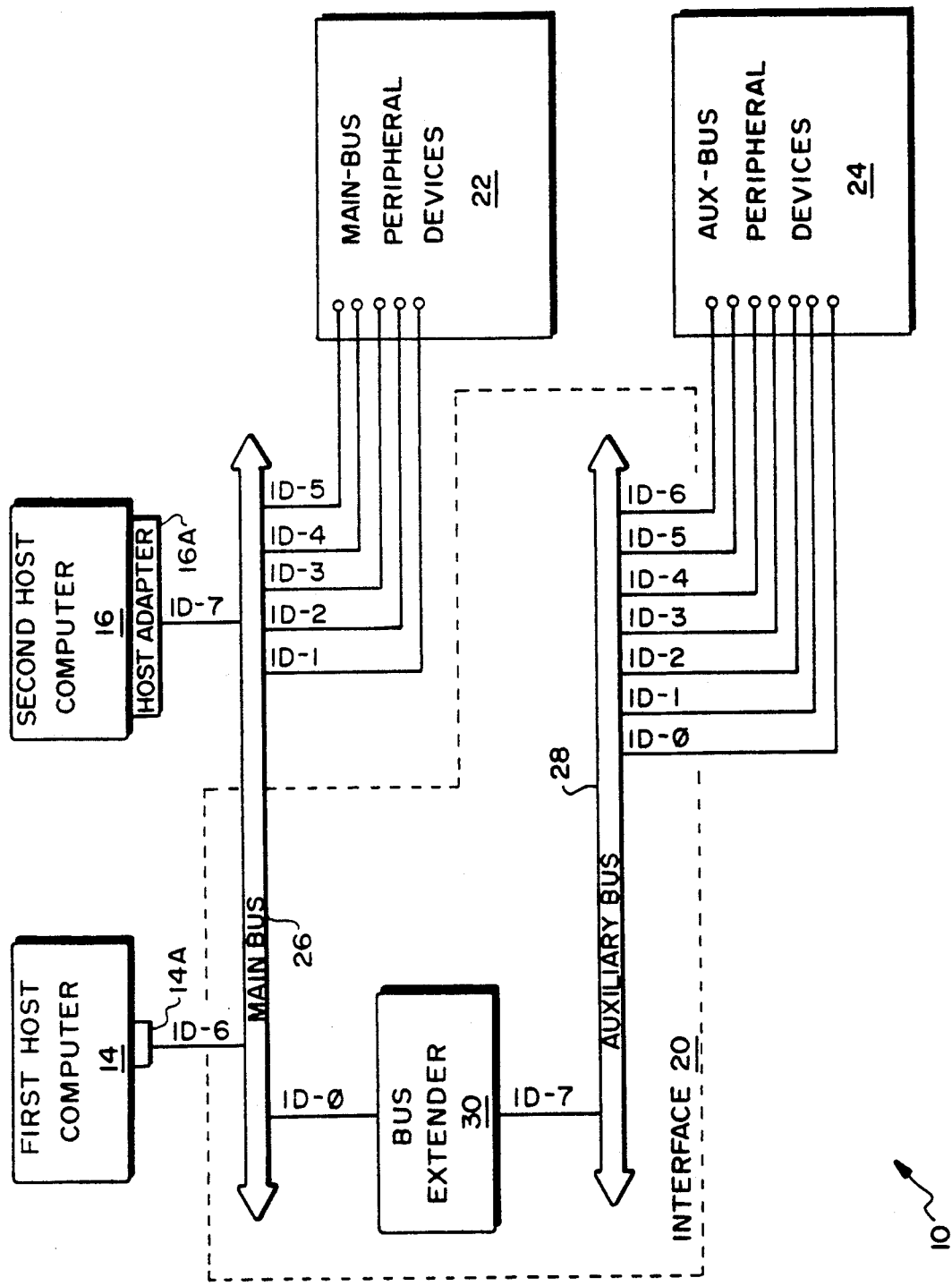
FIG. 1 is a block diagram of a computer system having a SCSI interface including main and auxiliary buses and a bus extender in accordance with the present invention.

FIG. 1 shows a computer system 10 in accordance with an illustrative embodiment of the invention as including first and second host computers 14, 16 interconnected by a SCSI interface 20 with first and second sets of respectively six and seven SCSI-conforming peripheral devices 22, 24. The SCSI interface 20 includes a main bus 26 to which the first and second host computers 14, 16 and the peripheral devices 22 (called the "main-bus peripheral devices") are connected, an auxiliary bus 28 to which peripheral devices 24 (called the "auxiliary-bus peripheral devices") are connected, and a bus extender 30 for interconnecting the main and auxiliary buses 26, 28. Each host computer 14, 16 is connected to the main bus 26 via a conventional SCSI port 14A, or, if necessary, a conventional host adapter 16A incorporating such a port.

The interface 20 is responsible for transferring digital signals including message signals from the host computers 14, 16 to the auxiliary-bus peripheral devices 24, or in the opposite direction, that is, from the auxiliary-bus peripheral devices 24 to the host computers 14, 16.

Each computer 14, 16 and each main-bus peripheral device 22 has a unique address on the main bus 26 specified by an address-identification code ("ID"), designated in the drawings as ID_0 through ID_7. Analogously, each of the auxiliary-bus peripheral devices 24 has a unique address on the auxiliary bus 28 specified as ID_0 through ID_6.

The bus extender 30 occupies a unique address on each of the main and auxiliary buses 26, 28. For example, the bus extender 30 has a main bus ID_0 and an auxiliary bus ID_7. The specific assignment of address ID's can be varied by those skilled in the art, although priority during signal contention on the buses as discussed below should be taken into consideration during ID assignment.

The particular configuration of the computer system 10 of FIG. 1 is for illustrative purposes only. Any combination of computers and main-bus peripheral devices can be used in conjunction with the invention, as long as at least one computer is connected to the main bus 26. For instance, a single computer and seven peripheral devices could be connected to the main bus. The auxiliary bus 28 can support only peripheral devices.

Figure 2:
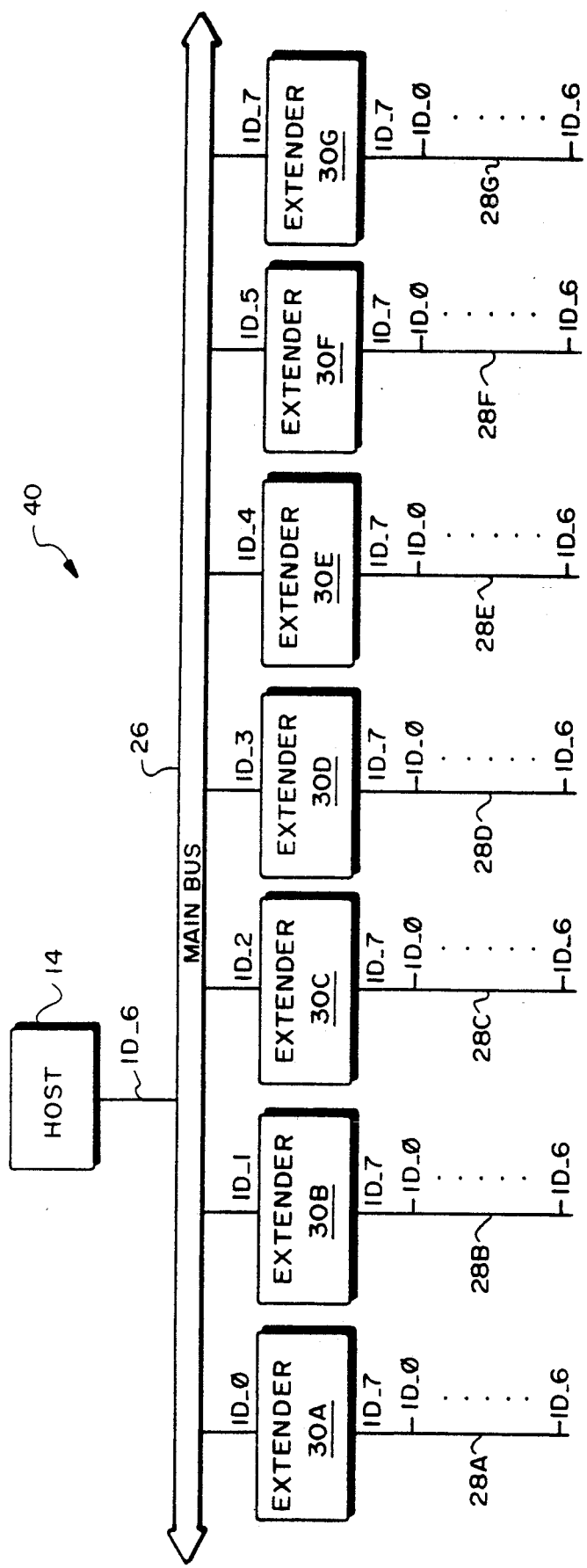
FIG. 2 is a block diagram of a computer system having a SCSI interface including a main bus connected to a plurality of auxiliary buses by means of bus extenders in accordance with an alternative practice of the invention.

FIG. 2 illustrates a computer system 40 having yet a different configuration. (For convenience, the same reference numbers will be used for analogous features in the drawings.) The main bus 26 in computer system 40 connects a single host computer 14 to seven bus extenders 30A-30G, which connect to seven auxiliary buses 28A-28G. Each auxiliary bus 28 supports seven auxiliary-bus peripheral devices 24. With this configuration, as many as 49 peripheral devices can be connected to a single SCSI port of the host computer 14.

Of significance, the peripheral devices connectable to the host computer through the practice of the invention can be commercially available units. The peripheral devices need not be specifically adapted or modified in terms of either hardware or software for use in conjunction with the invention so long as they conform to the SCSI standards.

Figure 3:
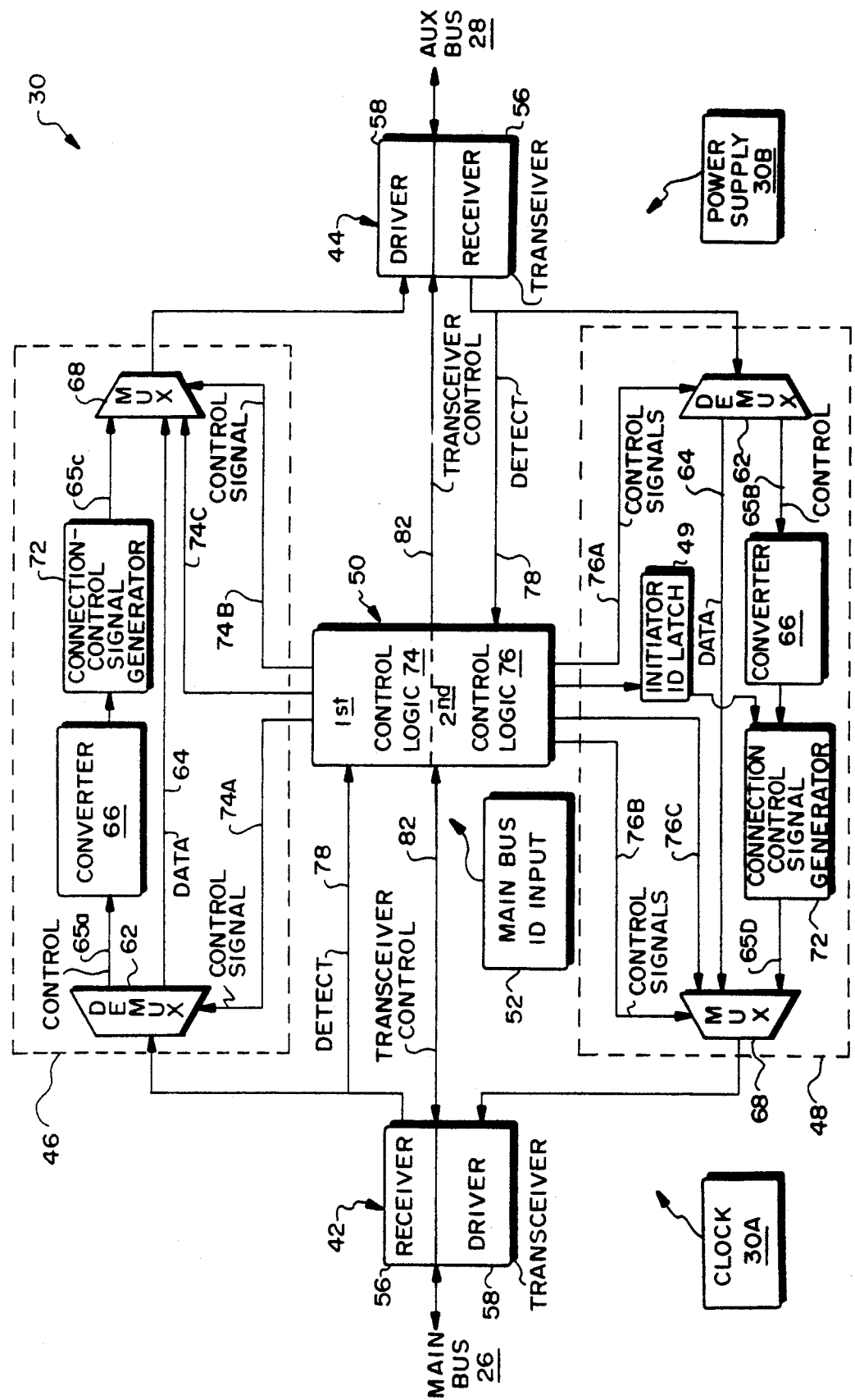
FIG. 3 is a block diagram of the bus extender of FIG. 1.

FIG. 3 shows a block diagram of the bus extender 30. as including main-bus and auxiliary-bus transceivers 42, 44, transfer circuits 46, 48 for selectively passing signals between the main-bus transceiver 42 and the auxiliary-bus transceiver 44, a storage device such as latch 49 for storing initiator ID's, and control logic 50 for controlling the operation of the other components of the extender 30. The extender 30 also has a main-bus ID-input arrangement 52, such as a group of switches, which permits a user to manually enter, and then store, a main-bus ID identifying the extender 30. In addition, the extender 30 has a clock 30A for providing timing signals, and a power supply 30B.

Each transceiver 42, 44 has a receiver 56 for receiving signals from the respective originating buses 26, 28, and a driver 58 for sending or asserting signals on the respective target buses 28, 26. The transceivers 42, 44 can be either both differential or both single-ended transceivers, or one can be differential and the other single-ended, and, in any event, should conform with the type of signal lines on the bus 26, 28 to which each transceiver 42, 44 is connected.

Each transfer circuit 46, 48 modifies certain signals, i.e., connection-control signals, received by the transceivers 44, 48, and passes other signals, i.e., message data signals, without modification. Each transfer circuit 46, 48 has a demultiplexer 62 ("DEMUX") for receiving the received signals at a data input thereof from the respective transceiver 42, 44 and, in response to a control signal at a control input thereof, for passing the message data signals onto direct data lines 64 connected to a first output of the DEMUX 62 and passing the connection-control signals 65A, 65B to a converter 66 connected to a second output of the DEMUX 62. The direct data lines 64 of the transfer circuit 46, 48 directly couple the message data signal passed by the DEMUX 62 to a multiplexer 68 ("MUX") at a first data input thereof.

The converter 66 translates the ID and LUN field data of the connection-control signals 65A, 65B into appropriate ID and LUN field data for use on the destination bus 28, 26, in conformance with the address specifications of, e.g., the SCSI standards. The converter 66 then passes the generated ID and LUN field data to the connection-control signal generator 72, which forms connection-control signals 65C, 65D suitable for use on the bus 28, 26 that is to receive the communication. The operation of the converters 66 and signal generators 72 of the transfer circuits 46, 48 will be described more fully below.

The connection-control signals 65C, 65D generated by the signal generator 72 of the transfer circuit 46, 48 are applied to the MUX 68 at a second data input thereof. Responsive to a control signal 74B, 76B at a control input thereof, the MUX 68 passes either the message data signals received over the direct data lines 64, the connection-control signals 65C, 65D, or signals 74C, 76C generated by the control logic 50 (as described hereinafter), to the driver 58 of the target bus 28, 26.

The control logic 50 includes first and second control logic modules 74, 76, which (i) monitor, over detect lines 78, signals received by the transceivers 42, 44, and, in response thereto, (ii) control the direction of the transceivers 42, 44 (i.e., control whether the transceivers are driving or receiving signals) using transceiver control lines 82, (iii) control the operation of the DEMUX's 62 and the MUX's 68 by applying thereto appropriate control signals 74A, 74B, and 76A, 76B, and (iv) assert signals 74C, 76C to third data inputs of MUX's 68 to be sent over the target buses.

The control logic 50 controls the signals in accordance with FIGS. 4-8, and is preferably implemented economically through the use of application-specific integrated circuitry (ASIC), although the controller logic 50 can also constitute a programmable logic array or be made from discrete devices. The transfer circuits 46, 48 and the latch 49 can also be implemented using ASIC.

Figure 4:
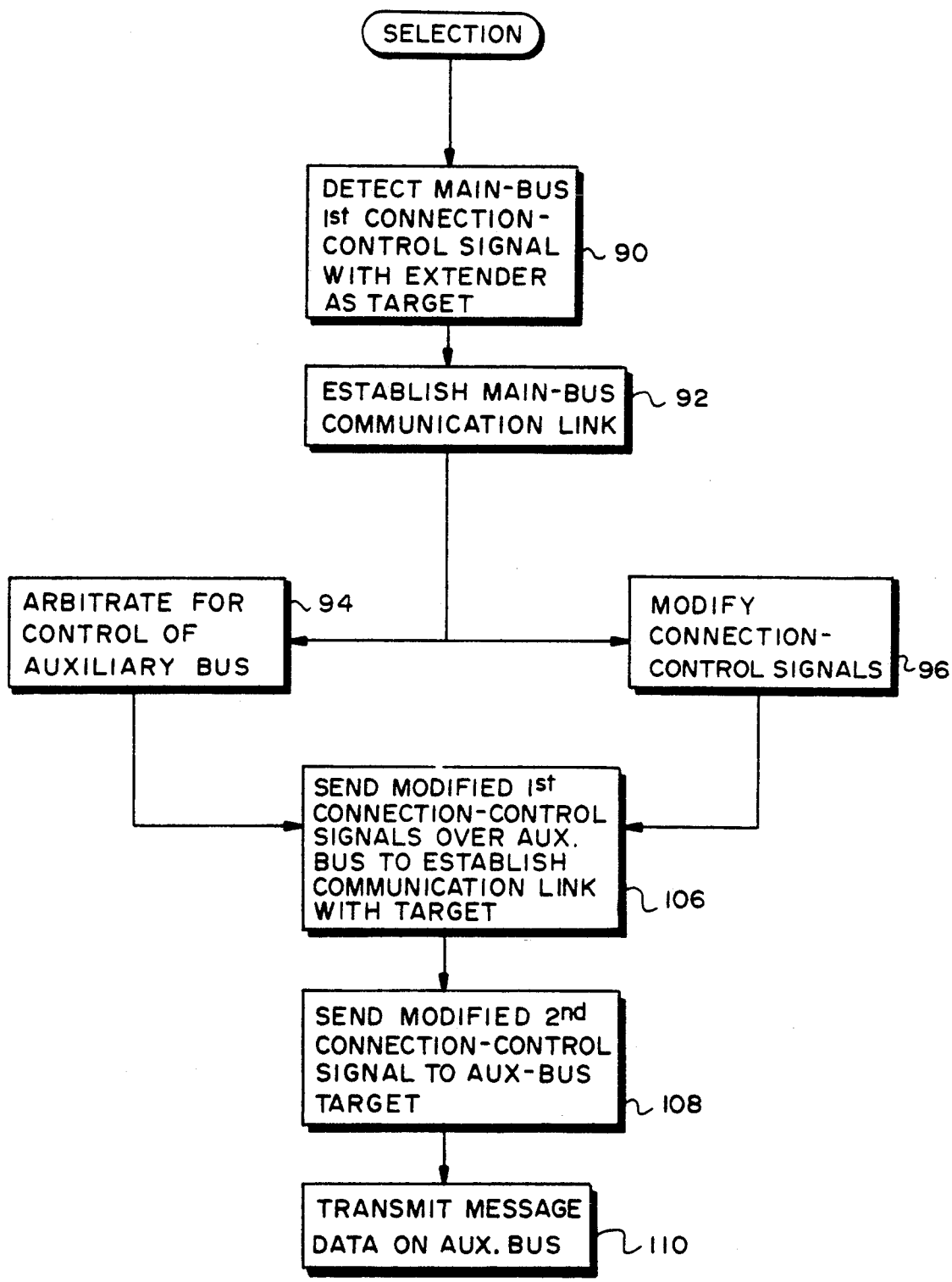
FIG. 4 is a flow chart depicting operation of the bus extender of FIG. 3 during information transfer from the host computer on the main bus to one of the peripheral devices on the auxiliary bus.
Figure 5:
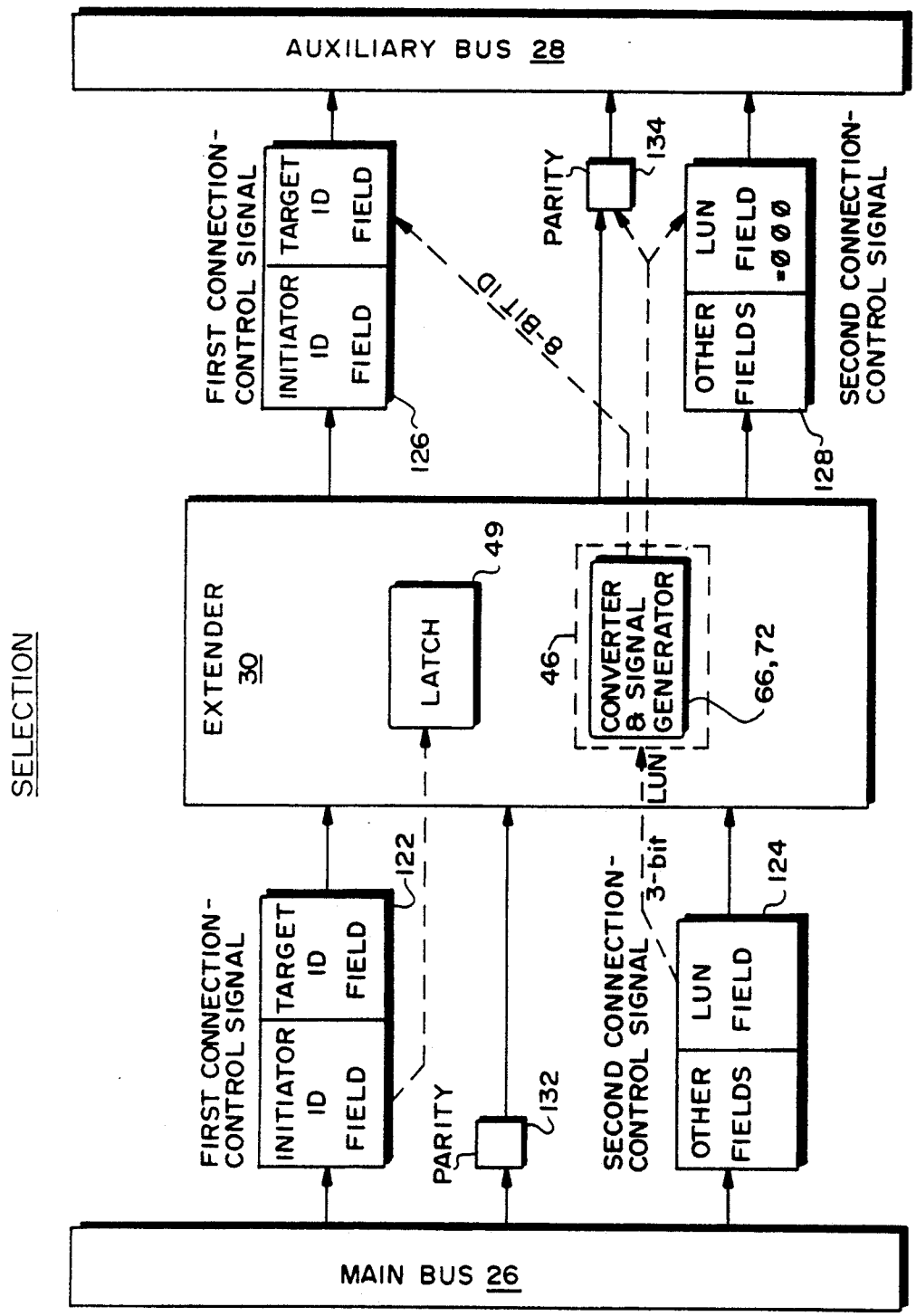
FIGS. 5 and 6 are diagrammatic representations of the modification of connection-control signals by the extender of FIG. 1 during SELECTION and RESELECTION, respectively.

FIGS. 4 and 5 provide an overview of the operation of the extender 30 during SELECTION-related phases, i.e., during the establishment of a communication link from the host computer 14 to a peripheral device 24 on the auxiliary bus 28 in accordance with the SCSI standards and the principles of the invention.

In block 90, the extender 30 monitors the signals on the main bus 26 in order to detect those containing data indicating that the extender 30 is the designated recipient. In other words, the extender 30 checks the target fields of first connection-control signals being sent over the main bus 26 for the extender's main-bus ID.

When such signals having the extender's main-bus ID are identified, the extender 30 establishes a communication link, in block 92, with the initiator whose ID is also specified in those signals. The initiator in this example is host computer 14.

Then, in block 94, the extender 30 arbitrates for control of the auxiliary bus 28, and also, in block 96, generates connection-control signals for the auxiliary bus 28 that specify the extender 30 as the initiator on that bus, and specify the ultimate target on the auxiliary bus 28 as the target of the ensuing message.

More specifically, as depicted in FIG. 5, first and second main-bus connection control signals 122, 124 are received from the main bus 26 by the extender 30, which uses the data in these signals to generate auxiliary-bus first and second connection control signals 126, 128 to be sent over the auxiliary bus 28. The main-bus first connection-control signal 122 has an initiator ID field providing the ID of the host computer 14 that originated the communication, and a target ID field that provides the extender's ID so as to identify the extender as the intended recipient on the main bus 26 of the communication. The main-bus second connection-control signals 124 correspond, e.g., to IDENTIFY signals under the SCSI standards, and include a LUN field, which, for purposes of the invention, specifies the ultimate target peripheral device 24 on the auxiliary bus 28. (The IDENTIFY signals also can contain other fields.) Thus, the host computer 14 is responsible for identifying both the extender 30 and the ultimate recipient of the communication in the main-bus connection-control signals.

The converter 66 of the transfer circuit 46 of the extender 30 translates the LUN field data of the received main-bus second connection-control signal 124 into the auxiliary-bus ID of the ultimate target on the auxiliary bus 28 for incorporation into an auxiliary-bus first connection-control signal 126. The converter 66 of circuit 46 also initializes the LUN field data to a predetermined value of, e.g., zero, for incorporation into an auxiliary-bus second connection-control signal 128.

The signal generator 72 of the transfer circuit 46 forms the auxiliary-bus first connection-control signal 126 by incorporating the ultimate target ID generated by the converter 66 in that signal's target ID field, and the extender's auxiliary-bus ID in that signal's initiator ID field. The signal generator 72 of circuit 46 also forms an auxiliary-bus second connection-control signal 128 by incorporating the initialized LUN value into that signal's LUN field, and the data from the other fields of the main-bus second connection-control signal 124 into the other fields of the auxiliary-bus second connection-control signal 128.

In addition, the extender 30 assures that the parity bit provided by the SCSI standards is correct for the generated IDENTIFY message. Specifically, the extender 30 modifies the parity bit 132 received from the main bus 26 based on whether the change in the value of the LUN field changed the parity for the LUN field, i.e., from even to odd, or odd to even, and provides the modified parity bit 134 to the auxiliary bus 28. Accordingly, the extender 30 changes the parity of the IDENTIFY message based solely on the LUN field data.

Moreover, the extender 30 stores the initiator ID field of the main-bus first connection-control signal 122 in latch 49 for use in case the peripheral device 24 elects to RESELECT the host computer 14 at a later time following a discontinuation of the original communication. Latch 50A stores the ID so that it can be accessed using the ID's of the targets seeking RESELECTION. This will be described more fully below.

With reference again to FIG. 4, in block 106, the extender 30 sends the auxiliary-bus first connection-control signal on the auxiliary bus 28 to establish a communication link with the ultimate target. Once the link is established, the extender 30 sends auxiliary-bus second connection-control signal in block 108, and the message data follows, pursuant to block 110.

Figure 6:
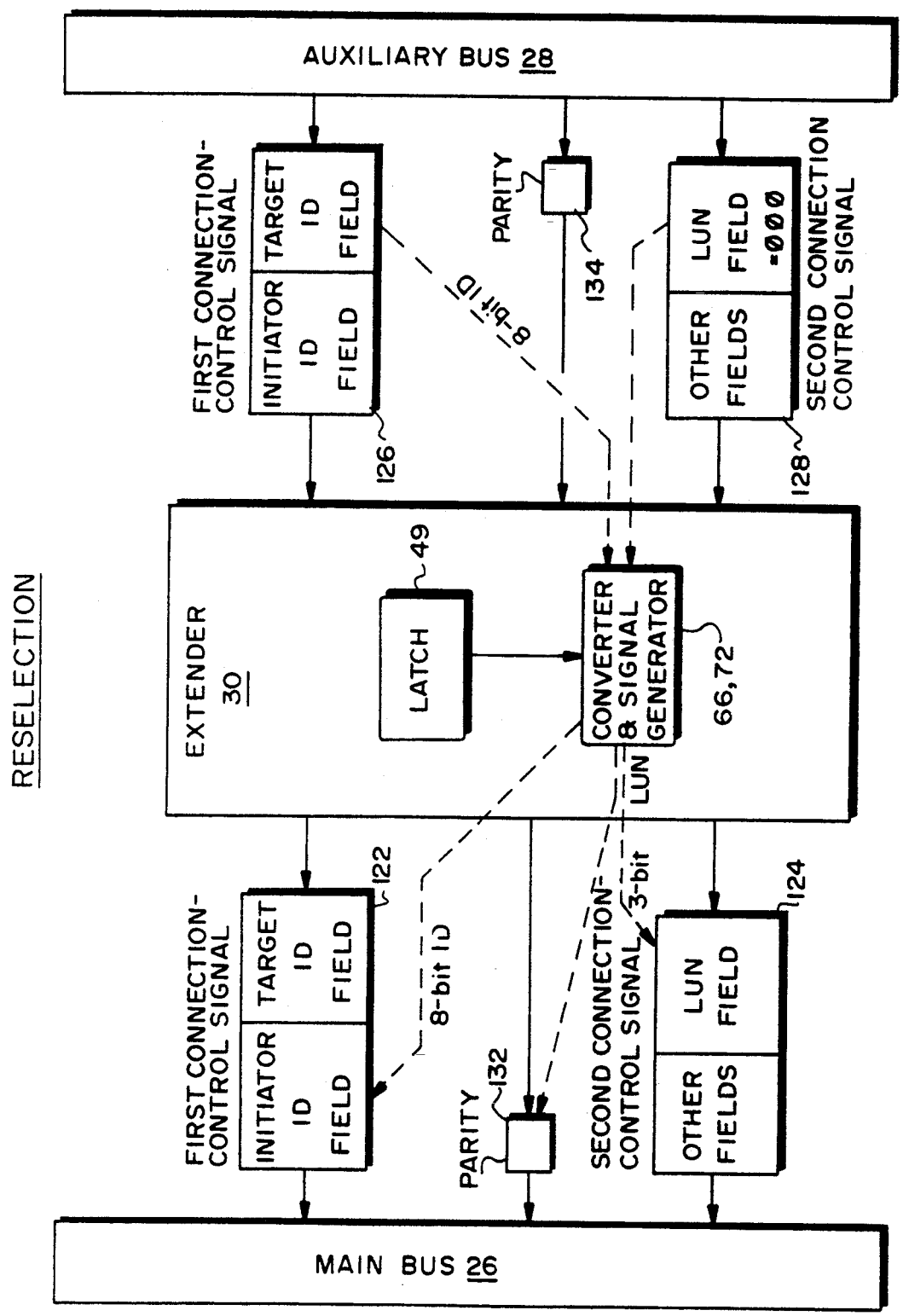

During RESELECTION following a discontinued communication, i.e., for transferring information from a peripheral device 24 on the auxiliary bus 28 to the host computer 14 that initiated the earlier communication, the extender 30 operates in an analogous way to that just described. However, as shown in FIG. 6, there are some differences, as will be explained in the following discussion.

During RESELECTION, the extender 30 receives an auxiliary-bus first connection-control signal 126 from the auxiliary bus 28, which signal has an initiator ID field providing the extender's auxiliary bus ID, and a target ID field providing the auxiliary-bus ID of the peripheral device seeking to reestablish the communication. The extender 30 also receives an auxiliary-bus second connection-control signal 128 that has an initialized LUN field (e.g., having a zero value).

The converter 66 of transfer circuit 48 of the extender 30 translates the LUN field data of the received auxiliary-bus second connection-control signal 128 into a LUN value corresponding to the contents of the target ID field of the auxiliary-bus second connection-control signal 128, i.e., to the auxiliary-bus ID of the peripheral device seeking RESELECTION.

The signal generator 72 of the transfer circuit 46 forms the main-bus first connection-control signal 122 by fetching the ID of the original initiator of the previously discontinued communication from latch 49, and incorporating the fetched ID as that signal's initiator ID field, and incorporating the extender's auxiliary-bus ID in that signal's target ID field. The signal generator 72 of circuit 48 also forms a main-bus second connection-control signal 124 by incorporating the LUN value generated by converter 66 of circuit 48 into that signal's LUN field, and the data from the other fields of the auxiliary-bus second connection-control signal 128 into the other fields of main-bus second connection-control signal 124.

In addition, the extender 30 again assures that the parity bit 132 is correct for the generated IDENTIFY message. Specifically, the extender 30 modifies the parity bit received from the auxiliary bus 28 based on whether the change in the value of the LUN field changed the parity for the LUN field. Accordingly, as with respect to SELECTION, the extender 30 changes the parity of the IDENTIFY message during RESELECTION based solely on the LUN field data, and provides the modified parity bit 134 to the main bus 26.

Figure 7:
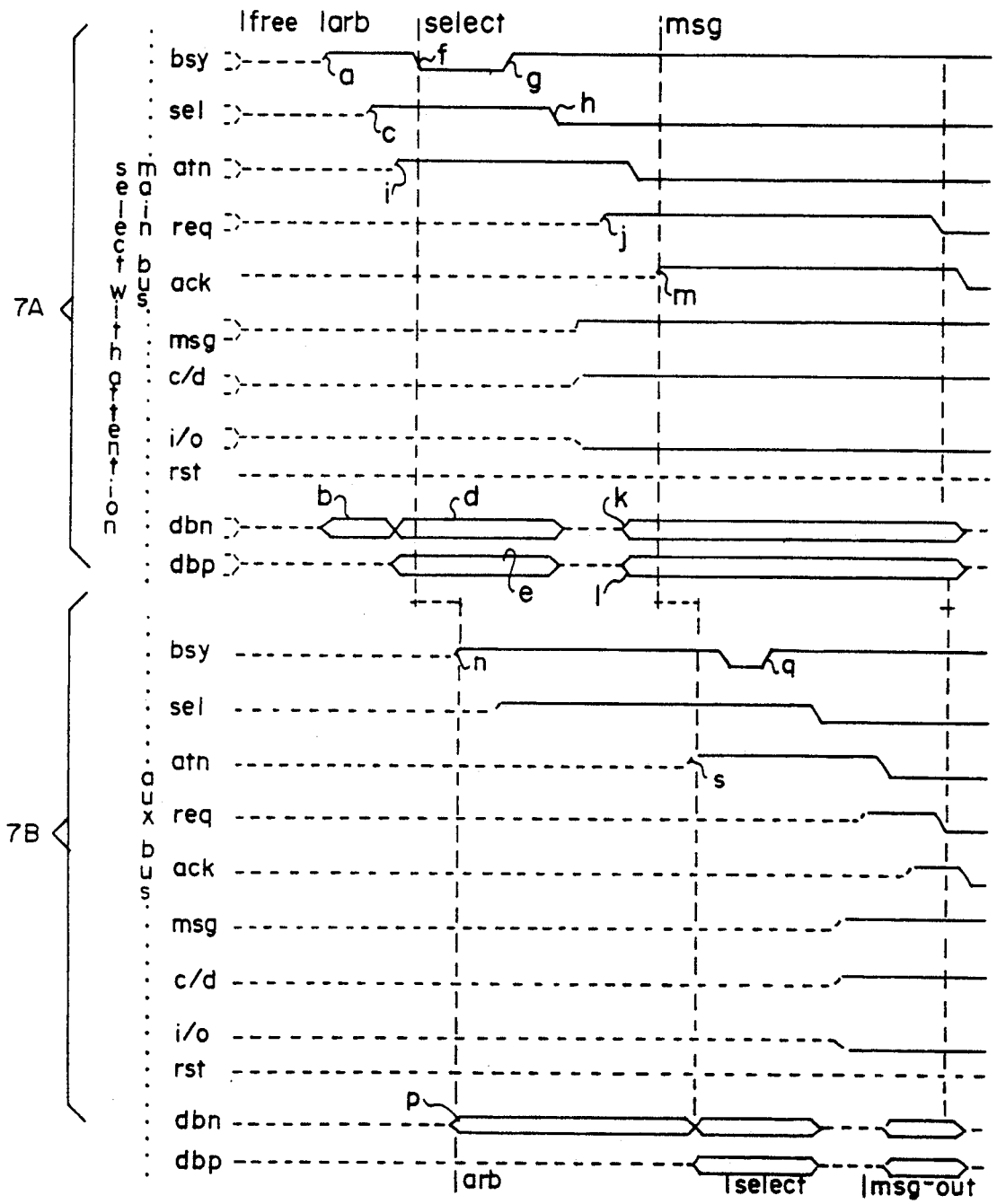
FIGS. 7 and 8 are signal sequence diagrams depicting illustrative operations of the computer system of FIG. 1 during SELECTION and RESELECTION, respectively.
Figure 8:
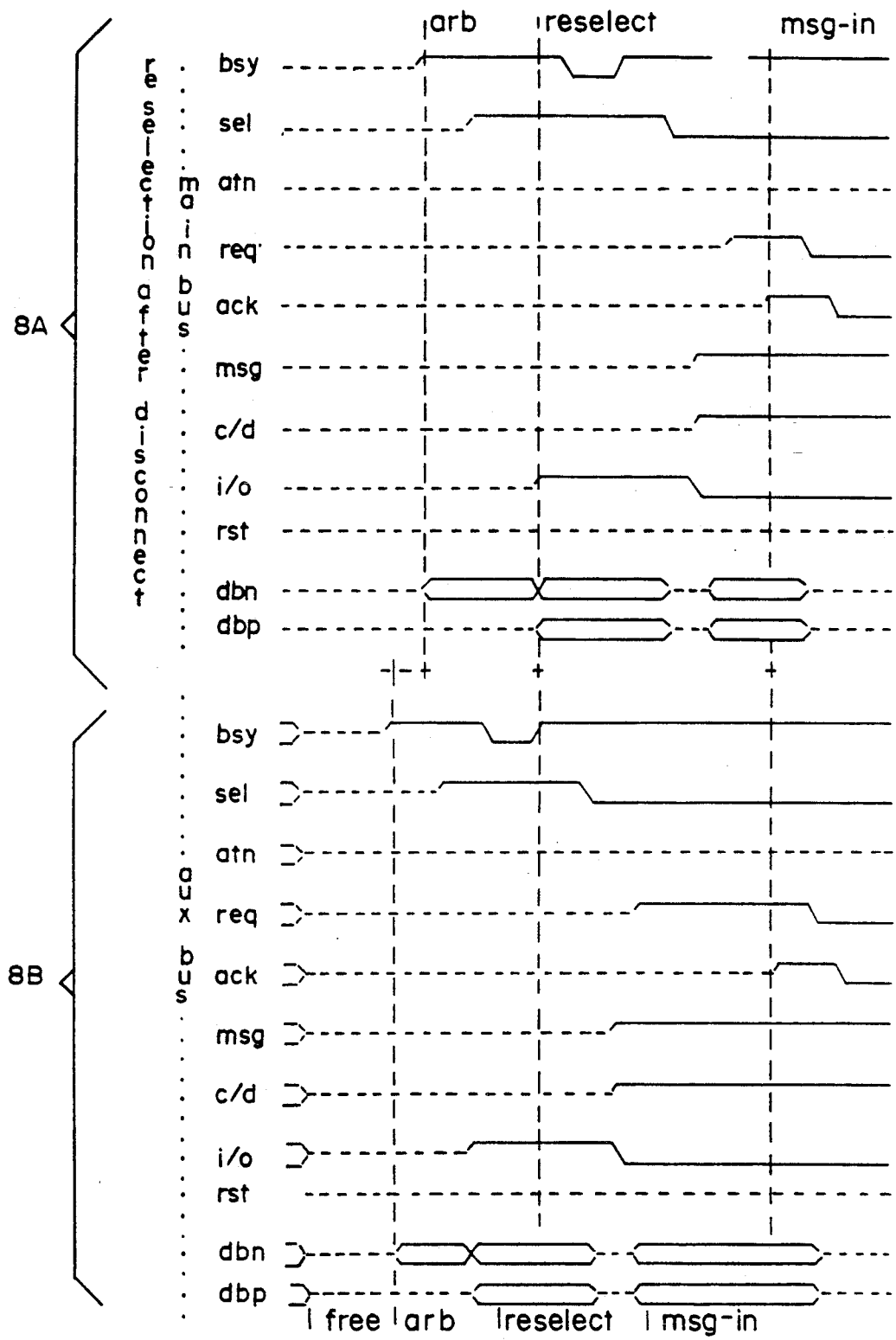

FIGS. 7 and 8 will form the basis of the following more detailed discussion of the operation of the bus extender 30. These figures show signal sequence diagrams of SELECT with ATTENTION and RESELECTION after DISCONNECT, respectively, and employ positive logic (i.e., signals are asserted when their values are DIGITAL high) to denote the state and timing of digital signals. The various lines comprising the buses are denominated along the left margin of the drawings, with the main-bus lines shown in the top half (designated 7A, 8A) of the drawings, and the auxiliary bus signals in the bottom half (designated 7B, 8B) of the drawings. Various phases of the signaling process are listed along the top of the drawings.

With reference to FIG. 7, during an initial period of time, which is denoted as "free" at the top of the drawing, none of the lines are asserted, i.e., the bus 26 is quiet and available for communication.

To transfer messages, the host computer 14 attempts to gain control of the main bus 26 during what is called the ARBITRATION phase by asserting the BUSY line ("bsy") at "a" in part 7A of the drawing, and asserting the host computer's own ID on the data lines ("dbn") at "b." (In SCSI buses, there are, e.g., eight data lines, one corresponding to each of the ID's (i.e., ID_0-ID_7) that can be assigned to devices on the bus. Thus, for example, to assert ID_6, the sixth data line is driven HIGH.)

If at the time the host computer 14 is attempting to control the main bus 26, any other device or devices are likewise attempting to do so, the bus is deemed to be in contention. In that case, according to the SCSI standards, the contending device with the highest ID is given priority. Thus, for example, if the extender 30 were also attempting to control the main bus 26, the control logic 50 would assert BUSY and the extender's ID, i.e., ID_0, on the data lines. Since, the computer's ID_6 is higher than the extender's ID_0, the extender 30 would fall off the main bus 26, and the host computer 14 would gain control of the main bus 26 by asserting the SELECT line ("sel"). If there are no contenders for the bus, then the host computer 14 simply can assert "sel," as shown at "c." This finishes the main-bus ARBITRATION phase.

Now, the host computer 14 attempts to establish a communication link with a target on the main bus 26 within what is called the SELECTION phase by sending a first connection control signal over the data lines ("dbn") as shown at "d," which signal gives both the host computer's own ID as the initiator and the target's ID on the main bus 26. Consequently, two of the data lines are asserted—the two corresponding to the host computer and the target. In addition, the correct parity for the asserted data bits, i.e., in this case, a HIGH value, is maintained on the data parity line ("dbp"). In other words, dbp is asserted at "e.". Moreover, another signal line, the I/O control line ("i/o"), is deasserted to indicate SELECTION. (Assertion of the i/o line indicates RESELECTION.) Afterwards, the initiator also deasserts BUSY at "f."

In order to illustrate the invention, we will assume that the target ID asserted during SELECT is that of the bus extender 30, e.g., ID_0, which means that the host computer 14 is attempting to communicate with one of the auxiliary-bus peripheral devices 24. Accordingly, during SELECT, the control logic 50 of the extender 30 identifies the target as ID_0, and verifies that SELECT is asserted and that BUSY is deasserted. In addition, the control logic 50 verifies that the parity is correct, and that there are two, and only two, bits asserted on the dbn lines.

Once the extender 30 has confirmed that it is the target, the extender accepts SELECTION by asserting BUSY on the main bus 26, as shown at point "g" in FIG. 5. In response to the acceptance, the host computer 14 deasserts SELECT at "h."

Another signal that plays a part during SELECTION is ATTENTION ("atn"). With the start of SELECTION, the atn line is either asserted or left deasserted. If asserted, as shown at point "i" in the drawing, the initiator is "selecting with attention," which informs the target that the initiator has a message for transfer out, in which case the target goes into a message-out phase after SELECTION and readies itself to receive a message, i.e., enables the receiver of the target's transceiver. On the other hand, if SELECTION is not accompanied by ATTENTION being asserted, i.e., the atn line is LOW, the target knows the initiator is inviting the target to control flow of information. Therefore, the target will go into, e.g., a message-in phase, in which the target will send a message, and, accordingly, will enable its own driver.

For purposes of this discussion, the SELECTION is with ATTENTION, and the status of the ATTENTION and MESSAGE lines is determined by the control logic 50 of the extender 30. Therefore, the extender 30 prepares for a message-out phase, as is shown in the drawings. In the message-out phase, the bus extender 30 leaves the data lines deasserted since it is expecting data from the host computer 14 to be sent over those lines. Furthermore, the control logic 50 enables the receiver 56 of the main-bus transceiver 42 and the driver 58 of the auxiliary-bus transceiver 44.

At this point in the discussion, we turn to two other lines, called REQUEST ("req") and ACKNOWLEDGE ("ack"), which carry handshake signals. The control logic 50 of the extender 30 will assert "req" at point "j" in FIG. 5 to request that a message from the host computer 14 be sent over the data lines. The host computer 14 as the initiator responds to the REQUEST by sending data on the data lines at "k," setting the correct data parity for the data being sent at "l", and asserting "ack" at "m."

In order for the bus extender 30 to pass the message data to the ultimate target on the auxiliary bus 28, the extender has to identify that device. The host computer 14 sends an identification of the ultimate target in an IDENTIFY message, which, pursuant to the SCSI standards, usually begins the message data transmission.

The IDENTIFY message according to the SCSI standards has a logical unit number ("LUN") field that can serve as an address-descriptor. While conventionally the LUN field is used for other purposes, the invention uses that field to designate the peripheral device which is the ultimate target on the auxiliary bus 28 to which the host computer 14 is sending the messages.

In order to pass the message on to the designated ultimate target, however, the extender 30 has to generate appropriate connection-control signals for the auxiliary bus 28. It will be remembered that a first connection-control signal generally contains the ID of a device on the SCSI bus that is initiating the information transfer, and the ID of the target on that bus. Accordingly, the main-bus connection-control signals received by the bus extender 30 typically has to be translated to those which the ultimate target will recognize, i.e., to connection-control signals having auxiliary bus ID's for the initiator and target on the auxiliary bus 28. (Furthermore, SCSI-conforming peripheral devices typically expect the value of the LUN field to be zero.)

Consequently, the converter 66 is charged with recovering the data from the LUN field of the main-bus second connection-control signal, i.e., the IDENTIFY message, and translating that data into the auxiliary-bus ID of the ultimate target. Since, according to the standards, the LUN field is three-bits wide, and the ID is an eight-bit number with a single bit HIGH, the translating process is essentially a 3-bit to 8-bit ("3b/8b") decoding resulting in a bit mask containing eight bits. The various bit masks for each LUN value are given in the table below:

| LUN | BIT MASK | VALUE |
| --- | --- | --- |
| 000 | 00000001 | 0 |
| 001 | 00000010 | 1 |
| 010 | 00000100 | 2 |
| 011 | 00001000 | 3 |
| 100 | 00010000 | 4 |
| 101 | 00100000 | 5 |
| 110 | 01000000 | 6 |
| 111 | 10000000 | 7 |

The resulting ID can then be used as part of the first connection-control signal on the auxiliary bus 28. The other part of that signal is the initiator ID, which is provided by the signal generator 72 and is the preferably factory-set auxiliary-bus ID of the extender 30, which is shown in FIG. 1 as ID_7.

Since, preferably, message data is transferred without significant delay in the extender 30 from one bus to the other, the extender 30 performs certain steps with respect to the auxiliary bus 28 at the same time as the extender 30 is responding to the main bus 26. Thus, while holding the req line asserted on the main bus 26, the extender 30 undertakes ARBITRATION and SELECTION on the auxiliary bus so as to reach the message-out phase as soon as possible.

Accordingly, the extender 30 initiates auxiliary-bus ARBITRATION as soon as it detects a main-bus SELECT signal with the extender designated as the target. For this, the extender 30 asserts BUSY on the auxiliary bus 28 at point "n," and its own ID, which is shown in FIG. 1 as ID_7, on the data lines dbn at "p."

Since that ID has the highest value, if contention for the bus 28 occurs, the extender 30 will always have the highest priority. Thus, if any peripheral device 24 on the auxiliary bus 28 is attempting RESELECTION at the same time as the extender 30 is attempting to gain control of the auxiliary bus 28 for SELECTION, the extender will prevail. This gives the host computers 14, 16 preference on the auxiliary bus 28 during contention, which is desirable to permit greater utilization of the peripherals by promoting parallel or overlapping operation of the peripheral devices.

After gaining control of the auxiliary bus 28, the extender 30 then asserts an auxiliary-bus first connection-control signal, which the extender 30 generates using data from the main-bus IDENTIFY signal, as described above. The target with that ID responds by asserting BUSY on the auxiliary bus 28 at "q."

Because the extender 30 asserts the atn line at point "r" on the auxiliary bus 28 whenever that line is asserted on the main bus 26, the target prepares to enter a message out phase, which starts with an IDENTIFY message from extender 30. After the IDENTIFY, the extender 30 asserts the ack line on the auxiliary bus 28 at "s," which tells the target that message data (in contradistinction to connection-control signals) can be received.

For message data transfer, the main and auxiliary buses 26, 28 are connected directly via the DEMUX 62 and MUX 68. The skew time and delays through these components along the message data path are preferably as short as possible.

During message transfer, the extender 30 no longer intervenes in the information transfer. Instead, the extender 30 simply monitors the transfer for IDENTIFY signals, which will require translation by the extender 30, as described above, and monitors the i/o line to detect any change in transfer direction that would require the extender to change the direction of its transceivers 42, 44. In addition, the extender 30 monitors the BUSY and SELECT lines to detect termination of the data transfer, which would result in a bus free phase and permit another SELECTION or a RESELECTION.

FIG. 8 illustrates RESELECTION after a DISCONNECT, which proceeds in a fashion analogous to that just described for selection. In RESELECTION, the target reverses the state of the i/o line. The extender 30 responds to a auxiliary-bus first connection-control signal from the target on the auxiliary bus 26 that contains the extender's own auxiliary-bus ID. When such a connection-control signal is received, the extender 30 immediately arbitrates for the main bus 26, and sends a main-bus connection-control, using its own main-bus ID in the initiator field. Since a RESELECT is merely the continuation of a prior information transfer, the extender 30 preferably stores the ID of the initiator of the earlier SELECT within the latch 49, and uses the stored initiator ID corresponding with the target that performed the RESELECT to generate the main-bus connection-control signals. Message transfer thereafter ensues.

In the event the main bus 26 is BUSY when the extender 30 receives a RESELECT (e.g., the computer 14 is communicating with another device 16, 22 on the main bus 26), the extender 30 waits until the main bus becomes free and then arbitrates for control. During this time, the auxiliary bus 28 is hung, and no communication on that bus takes place.

Moreover, in the event a contention occurs between a SELECTION and a RESELECTION, the extender 30 preferably causes an "unexpected bus free" state, as specified in the SCSI standards, to occur on the main bus 26 after the SELECTION has completed and the IDENTIFY message has been acquired. Preferably, the host computer 14 interprets such a state as indicating that a RESELECTION from the extender 30 is desired, and, e.g., permits RESELECTION to ensue.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. For interconnecting a main bus having a first device connected thereto to an auxiliary bus having a plurality of second devices connected thereto and for permitting communication between said first device and said second devices, a bus extender comprising:
  A) main-bus and auxiliary-bus transceivers for sending and receiving first and second sets of connection-control signals and a plurality of message data signals over respective main and auxiliary buses, a plurality of said first sets of connection-control signals containing identifiers corresponding to said extender, and
  B) transfer circuit means coupled between said main-bus and auxiliary-bus transceivers for receiving said extender-identifier-containing first sets of connection-control signals from one of said transceivers, selectively translating said received extender-identifier-containing first sets of connection-control signals into second sets of connection-control signals, and passing said second sets of connection-control signals to the other of said transceivers, and for passing a plurality of message data signals (1) received from said one transceiver, and (2) corresponding to said extender-identifier-containing first connection-control signals, directly from said one transceiver to said other transceiver, said transfer circuit means including
    i) converter means for converting data in said first set of connection-control signals into target identifiers for use in identifying the second devices to which the message data signals are to be sent by said other transceiver, and
    ii) connection-control signal generating means coupled with said converter means for forming said second sets of connection-control signals, said second sets of connection-control signals including said target identifiers.

2. The bus extender in accordance with claim 1, wherein said transfer circuit means further comprises first passing means coupled with said connection-control signal generating means for receiving said second sets of connection-control signals; and second passing means for receiving signals from said one transceiver, said received signals including said first sets of connection-control signals and said message data signals, and, in response to a plurality of first control signals, passing the message data signals to said first passing means and said first sets of connection-control signals to said converter means; said first passing means being responsive to a plurality of second control signals for passing said message data signals received from said second passing means and said second sets of connection-control signals to said other transceiver.

3. The bus extender in accordance with claim 1, wherein one of said main-bus and auxiliary-bus transceivers comprises a differential transceiver and the other comprises a single-ended transceiver.

4. The bus extender in accordance with claim 1, wherein said connection-control signal generating means forms second sets of connection-control signals having fields containing an identifier corresponding to said extender, and fields containing the target identifiers generated by said converter means.

5. The bus extender in accordance with claim 1, further comprising control logic means for supplying said first and second control signals to said first and second passing means.

6. The bus extender in accordance with claim 5, wherein said control logic means includes first and second control logic modules for monitoring signals received by said transceivers, and, in response thereto, controlling the direction of said transceivers.

7. The bus extender in accordance with claim 6, wherein said control logic means generates third connection-control signals in response to signals received by said one transceiver, and supplies said third connection-control signals to said other transceiver.

8. In an interface for interconnecting for communication a digital computer with a plurality of peripheral devices employing an addressing scheme including an address-identifying code (ID) field and an address-descriptor field, and including a main bus to which said computer is connected, and an auxiliary bus to which said peripheral devices are connected, a bus extender for interconnecting said main and auxiliary buses; each of said computer and said bus extender having a corresponding main-bus ID and each of said peripheral devices and said bus extender having a corresponding auxiliary-bus ID; said bus extender comprising A) a main-bus transceiver connected to said main bus for receiving therefrom a plurality of connection-control signals and a plurality of message signals, said connection-control signals having first address fields each providing an ID of a target, and second address fields each providing an address descriptor;

B) logic means coupled to said main-bus transceiver for identifying connection-control signals having said extender main-bus ID in said first address fields, said logic means including i) means for converting data included in the second address fields of the identified connection-control signals into corresponding auxiliary-bus ID's, and ii) means coupled with said converting means for forming modified connection-control signals having said auxiliary-bus ID's in the first address field's; and C) an auxiliary-bus transceiver coupled to said logic means for transmitting said modified connection-control signals on said auxiliary bus for establishing communication with the peripheral devices on said auxiliary bus identified by the auxiliary-bus ID's in the first address fields of the modified connection-control signals, and, upon communication being established, for transmitting message signals received by said main-bus transceiver directly onto said auxiliary bus.

9. The bus extender in accordance with claim 8, further including means for manually providing the extender main-bus ID.

10. An interface for interconnecting for communication a digital computer with a plurality of peripheral devices, said interface comprising a main bus to which said computer is connected, an auxiliary bus to which said peripheral devices are connected, and a bus extender for interconnecting said main and auxiliary buses; said interface employing an addressing scheme including an address-identifying code (ID) field and an address-descriptor field, each of said computer and said bus extender having a corresponding main-bus ID and each of said peripheral devices and said extender having a corresponding auxiliary-bus ID; said interface establishing communication between said computer and said peripheral devices using connection-control signals having a first address field providing the ID of a target and a second address field providing an address descriptor, said bus extender comprising A) a main-bus transceiver connected to said main bus for receiving therefrom said connection-control signals and a plurality of message signals;

B) logic means coupled to said main-bus transceiver for identifying connection-control signals having said extender-main-bus ID as a target ID, said logic means including i) means for converting data included in the address-descriptor fields of the identified connection-control signals into auxiliary-bus ID's, and ii) means coupled with the converting means for forming modified connection-control signals having said auxiliary-bus ID's in the first address fields;

C) an auxiliary-bus transceiver coupled to said logic means for transmitting said modified connection-control signals on said auxiliary bus for establishing communication with the peripheral devices on said auxiliary bus identified by the auxiliary-bus ID's specified as the target ID's by the modified connection-control signals, and, upon communication being established, for transmitting message signals received by said main-bus transceiver directly onto said auxiliary bus.

11. A bus extender for connecting a single port of on a first bus to a single port on a second bus so as to interconnect one or more first devices connected to said first bus to one or more second devices connected to said second bus, said bus extender comprising:

A) first-bus receiving means coupled to said first bus for receiving a plurality of first connection control signals and a plurality of first message data signals over said first bus, each of said first message data signals corresponding to at least one of said first connection control signals, a plurality of said first connection control signals including a plurality of second output terminal for supplying said first connection control signals to said first logic means; and B) second means for having a first input terminal for receiving said first message data signals from said direct data lines, a second input terminal for receiving said second connection control signals from said first logic means, and an output terminal response to a second control signal for supplying one of said first message data signals and said second connection control signals to said second-bus driving means, said passed first message data signals comprising said second message data signals.

24. The bus extender in accordance with claim 11, wherein said first logic means comprises:

A) converter means responsive to said extender first connection control signals for generating a plurality of converter outputs comprising a plurality of second-bus target identifiers corresponding to said second-bus ultimate target identifiers of said first connection control signals and a plurality of second-bus source identifiers corresponding to said bus extender; and B) generator means coupled with said converter means for generating said second connection control signals in response to said converter outputs.

25. A method of operating a bus extender that interconnects a first bus and a second bus for communication between a first device connected to said first bus and a second device connected to said second bus, said bus extender having a first ID on said first bus and a second ID on said second bus, said method comprising the steps of:

A) monitoring a plurality of target ID fields of a plurality of first connection control signals received over said first bus to identify those first connection control signals containing said first ID, thereby indicating that said bus extender is a designated recipient thereof, B) in response to said first connection control signals identified in step (A), (1) generating a plurality of initiator ID's from data in a plurality of initiator ID fields of said first connection control signals so as to identify an initiator for each said first connection control signal, and establishing communication link for each over said first bus with said identified initiator;

(2) arbitrating for control of a second bus;

(3) translating data contained in a plurality of descriptor fields of said first connection control signals into a plurality of target ID's on said second bus;

(4) generating a plurality of second connection control signals corresponding to said first connection control signals, said second connection control signal representing said target ID's on said second bus in a plurality of target ID fields, and said second ID's in a plurality of initiator fields;

(5) sending said second connection control signals over said second bus to establish for each a communication link with a target identified by said target ID.

26. The method in accordance with claim 25, wherein step (B) further includes the step of storing said initiator ID's.

* * * * *